Sept. 11, 1973   J. DENOJEAN   3,758,331
COVERING
Filed Oct. 13, 1970
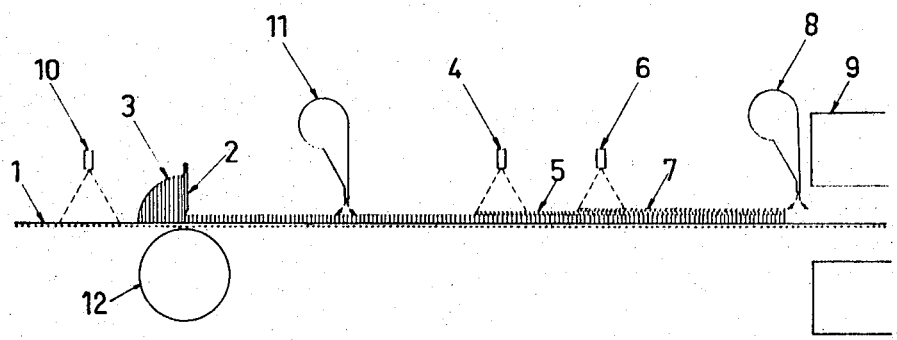
INVENTOR.
Jacques Denojean
BY Spencer & Kaye
ATTORNEYS.

United States Patent Office 3,758,331
Patented Sept. 11, 1973

3,758,331
COVERING
Jacques Denojean, Lyon, France, assignor to
Les Etablissements Marechal, Paris, France
Filed Oct. 13, 1970, Ser. No. 80,419
Claims priority, application France, Oct. 15, 1969,
6935293
Int. Cl. B44d 1/02, 1/44
U.S. Cl. 117—39  3 Claims

ABSTRACT OF THE DISCLOSURE

Decorative surface coverings are produced by depositing differently colored plastisols on a surface support, subjecting the plastisols to a blowing action to provide ripples or other undulations on their surface, and then heating to cause gelling of the plastisols.

BACKGROUND OF THE INVENTION

The present invention relates to a process for producing decorative surface coverings having varying degrees of coloring and thickness. These coverings are based on vinyl chloride polymers.

It is known to produce surface coverings having non-uniform coloring to imitate wood or marble. According to one technique of doing this, pastes containing differently colored polymers of vinyl chloride are mixed and the mixture is applied to a support and gelled in place. However, this technique cannot be used to obtain a progressive grading from one color to another. Even if the zones of various coloring are highly divided, the transitions are nevertheless always very distinct. Furthermore, when transparent compositions are used, it is not possible to obtain a three-dimensional effect in the colorings.

It is also known to use heat to emboss and print relief-designs on the surface of coverings made of polymers of vinyl chloride. However, such relief designs have a shape and regularity which detract from their beauty.

SUMMARY OF THE INVENTION

An object of the present invention, therefore, is to provide a process for producing polyvinyl chloride surface coverings with areas of different color and with various progressive grading effects in the transitions between these areas.

Another object of the invention is to produce coverings which present color grading effects not only at the surface but throughout their entire thickness.

Yet another object of the invention is to produce surface coverings of non-uniform thickness in which the relief presents an undulated, corrugated, embossed, or wavy appearance.

These as well as other objects which will become apparent in the discussion that follows are achieved, according to the present invention, by depositing on a support plastisols having varying degrees of coloring and subjecting the thus treated surface to a blowing action before gelling the plastisols by heating. The plastisols are based on homopolymers or copolymers of vinyl chloride. The coverings of the present invention are characterized by a progressive grading of one color region into another; thus an observer, when looking at the surface of the covering, cannot perceive a line between two color regions along which an abrupt or discontinuous color change occurs, where "line" is used in its mathematical sense and thus has no width.

BRIEF DESCRIPTION OF THE DRAWING

The sole figure of the drawing is a schematic illustration of apparatus for carrying out the process of the invention.

DESCRIPTION OF THE PREFERRED EMBODIMENTS

In accordance with the process of the invention, a number of materials can be used as the support for the plastisols. Particular examples are fabric bands made by knitting, weaving, or by the various procedures used for producing felted materials. Examples of the fibers in these fabric products include natural fibers, cellulose derivative fibers, synthetic polymer fibers, and mixtures of these fibers.

Other materials are also suitable as supports; for example, plastic materials, products derived from the paper industry (paper, cardboard, corrugated pasteboard, and the like), the timber industry (laminated and agglomerated wood boards and the like) and the metallurgical industry (cold-rolled steel sheets, wide aluminum extrusions, and the like).

The support may be planar and is preferably in the form of a very wide band. However, supports having any kind of configuration can be used, particularly supports which have been subjected to a preforming process.

The support can be subjected to a pre-treatment intended to improve the adhesion of the plastisols. Examples of such treatment are the application of an adhesive deposit, and the degreasing of metal supports.

The support can be permanent and form an integral piece with the plastisols after such have been gelled. This is particularly the case when the support is a woven fabric constituting the reverse side of the covering and improving the adhesiveness of the covering on an object such as a table top.

The support can also be temporary, it being removed following the gelling of the plastisol. For example, it is possible to use as supports endless metallic bands from which the plastisol is disengaged after gelling and cooling. The support can also be removed only immediately prior to utilizing the gelled plastisol. For example, it is possible to use as a support a silicone paper which is provided with a permanent adhesive. After removing the paper, the gelled plastisol is ready to be applied to a surface to be decorated.

When plastisols intended to produce a transparent or translucent decorative layer are deposited on a support, a support whose surface has been previously decorated may be used. The previous decorating can, for example, include embossing, printing, the application of a layer of colored plastic material, a metallization, the depositing of decorative elements (fibers, scales), etc.

While carrying out the process of the invention, the support can remain fixed in place. Production is then carried out in successive steps; first the depositing of plastisols, this then followed by blowing. However, moving supports are preferably used, particularly very wide bands; this allows the process to be carried out on continuously moving conveyor chains. Each step of the process is then performed at a station. This procedure decreases manipulation, simplifies supervision and improves the reproducibility of the production.

Various techniques can be used to deposit the differently colored plastisols on the support. Particularly, the depositing can be carried out by any known procedure, such as by pouring, immersion, or coating with a doctor blade. Another procedure which is particularly interesting according to the invention consists in spraying the plastisols onto the support.

The plastisols of the present invention are dispersions of powdered polymer in plasticizing agents. The plastisols may also comprise secondary plasticizing agents, fillers, pigments, heat- and light-stabilizers, and fluidizing and thickening agents.

Polymers suitable for compounding the plastisols of the present invention include homopolymers or copolymers of vinyl chloride. In the case of the copolymers, the vinyl chloride content is high, generally on the order of at least 50 mol percent. These polymers may be produced by any known polymerization process. Examples are emulsion, suspension, and bulk polymerization. The K-number of these polymers is generally between 65 and 85.

When depositing procedures such as pouring, immersion, or coating are used, plastisols having a high viscosity are preferred in order to prevent complete homogenization of the differently colored plastisols during the subsequent blowing step. Preferably, expanding plastisols are used in which the viscosity $\eta$ increases when the rate of change of velocity normal to the flow, $du/dy$, increases. According to Newton's law of viscosity, $$\tau = \eta \frac{du}{dy}$$

where $\tau$ is the shear stress.

When the process includes spraying of the plastisols, compositions having a low viscosity are preferred. For this purpose, polymers obtained according to the emulsion polymerization process and plasticizing agents with a low solvating power (esters of straight chain acids) are used. The composition can also include fluidizing agents or even small quantities of organic solvents which behave as diluents.

Besides the usual additives, the plastisols of the invention may also contain various decorative elements such as colored beads, scales, fibers, etc. Another possibility is to add organic liquids which after gelling form occlusions in which the refractive and coloring indexes are different than those of the matrix. These occlusions confer a scintillating effect to the finished product. Examples of such organic liquids are glycols or the ethers thereof.

The amount of pigment used in the plastisols in the process of the invention is generally quite low, since one of the objects of the invention consists in producing coverings in which there is a grading of the coloring effects in three dimensions. To obtain a maximum grading effect in the thickness of the covering, one may use plastisols which are substantially transparent when gelled. To achieve this, the pigment should preferably possess a high resistance to heat and light.

It is also possible to deposit plastisols which are colorless and to spray onto them one or more pigmentary dispersions in an organic or aqueous medium. During the subsequent blowing step, the pigments are distributed at random in the mass of the plastisols.

It is understood that many known procedures for depositing differently colored plastisols in all the various possible combinations can be used simultaneously. For example, the support may be first coated using a doctor blade to deposit a uniform bottom layer of a plastisol which is only weakly colored; when one or more differently pigmented plastisols or, alternatively, one or more pigment dispersions are sprayed onto the surface of this bottom layer. Another procedure includes spraying two differently colored plastisols onto the support, followed by the spraying of a third plastisol which is transparent and colorless and which contains an organic liquid giving a scintillating effect to the product. As readily seen, the process of the present invention can yield a variety of different esthetic effects.

Spraying of the plastisols and pigment dispersions is particularly advantageous since it permits greater variation in the mixing of the differently colored plastisols. The guns used for the spraying may be fixedly mounted with respect to the support, or they may be given a periodic movement such as a back and forth motion. Furthermore, the emission of a spray from these guns can be programmed. It is even possible to obtain cyclic variations of the spray volume flow rate.

The diameters of the gun nozzles, the flow rate, the height of the nozzle above the support, etc., are determined in each particular case and are dependent on the nature of the plastisols or pigmentary dispersions and on the particular distribution which one is trying to obtain.

After deposition on the support and before being gelled, the differently colored plastisols are subjected to a blowing action by means of a gaseous flow. The effect of this gaseous flow is to cause a light kneading of the layer of plastisols. This causes a gradual interpenetration between variously colored plastisol zones and a modification of the surface relief.

This blowing treatment is preferably carried out by means of air flows which are accelerated in blast pipes. The shapes of the pipes are dependent on the effect desired in the plastisols and at the surface thereof. For example, an air flow in the form of a sheet of moving air causes the appearance of an irregularly undulated relief resembling the waves at the surface of the ocean. On the other hand, concentrated jets of air produce effects which look like spots.

A number of variations can be made in order to change the artistic result of the blowing operation. Examples are variations in the amount of gaseous flow, its inclination, and the distance between the nozzles and the layer of plastisols. It is also possible to periodically move the blowing nozzles or to cause a cyclic modification of their flow rates.

The gas which is used for blowing may be at room temperature or it may be heated. It is, for example, possible to heat the gas to a temperature at which the plastisols start to gel (about 160° C. when a homopolymer of vinyl chloride is used). In this case, the surface layer of plastisols is transformed from a paste into a solid and the relief which is produced by the gaseous flow is directly set.

Blowing can only be carried out after the plastisols have been deposited. However, it is possible to subject deposited primary plastisols to one or more intermediate blowing operations, perhaps at high temperature, before depositing other plastisols, in order to modify the appearance of the product.

After the plastisols have been deposited, and following blowing, the plastisols are gelled by treatment in an oven. Any type of oven which is in general use in industry for coating can be used. Examples are infrared ovens and high-frequency ovens. Oven temperature and the residence time of the covering in the oven are selected as a function of the nature of the plastisol and the thickness of the deposit.

The covering is then cooled down to room temperature before being conditioned prior to its final service. However, various finishing treatments can be applied to the covering while it is still hot. Examples of such treatments are printing, embossing with a large design, printing-embossing, and glazing to improve the surface brilliancy.

Flat coverings produced by the process according to the invention are mainly used for wall and ceiling surfacing. However, the process of the invention may also be applied for covering formed objects such as vases.

The artistic effects of the coverings of the present invention can be widely varied; a larger number of different decorations are obtainable than is possible with natural products such as wood and ceramic. In addition, the coverings of the invention are very easy to use and maintain. Esthetic effects can be obtained which have not been possible to date in any other coverings.

The invention is further illustrated by the following examples.

EXAMPLE I

The support 1 comprises a woven fabric which is covered by calendering with a layer of plasticized polyvinyl chloride in an amount equal to 200 grams per square meter. The support is in the form of an endless band 1350 mm. wide moving at a speed of 5 m./min. The support is moved by conveyor roll drive 12.

By means of the doctor blade 2, the surface support is covered with a layer of plastisol 3 in an amount equal to 1000 grams per square meter. The plastisol 3 contains the following materials in the following proportions on a weight basis:

| | Parts |
|---|---|
| Emulsion-type polyvinyl chloride (K=67) | 100 |
| Didecyl phthalate | 35 |
| Octyl epoxystearate sold under the trademark "Drapex 3/2" by Argus | 3 |
| Tin dibutyl maleate sold under the trademark "Estabex E" by Noury van der Lande | 1 |
| Ethylene glycol monomethyl ether | 3 |
| Ethylene glycol monoethyl ether | 2 |
| Hexylene glycol | 1.5 |
| Pigment ball-milled in dioctyl phthalate | 0.02 |

The polymer, the previously mixed liquids, and the pigment dispersion are successively introduced into a blade mixer and the resulting mixture is homogenized in the mixer for 30 minutes. The homogenized mixture is then filtered to yield plastisol 3 as the filtrate.

The support, laden with plastisol 3, then passes under the sprayer 4 which moves perpendicularly to the support to cover its entire width. This perpendicular movement is executed back and forth at the rate of 50 cycles per minute. Sprayer 4 deposits a layer of plastisol 5 containing the following materials in the following proportions on a weight basis:

| | Parts |
|---|---|
| Emulsion-type polyvinyl chloride (K=67) | 100 |
| Octyl adipate | 60 |
| Tin dibutyl maleate sold under the trademark "Estabex E" by Noury van der Lande | 1 |
| Ethylene glycol monomethyl ether | 3 |
| Ethylene glycol monoethyl ether | 2 |
| Hexylene glycol | 1.5 |
| Pigment ball-milled in dioctyl phthalate | 0.03 |

These components are mixed and filtered as described for plastisol 3 and the filtrate is collected as plastisol 5.

The sprayer 4 comprises a nozzle having a diameter of 1.4 mm. The nozzle opening is located 250 mm. above the support. The flow of air is adjusted so that the diameter at the base of the spraying cone is about 200 mm. Plastisol 5 is applied in an amount equal to 30 grams per square meter.

Sprayer 6 is identical to sprayer 4, both in design and spraying cone. It is used to deposit a plastisol 7 which is identical to plastisol 3 except that it contains a differently colored pigment. Plastisol 7 is applied in an amount equal to 30 grams per square meter.

The various deposited layers of plastisols are then submitted to the action of blower 8. Its opening from which its air-blast issues is a slot having a width of 2 mm. and a length of 1350 mm.; the length is perpendicular to the direction of movement of support 1. The opening is located 100 mm. above the support. The gage pressure of the air at the opening is 1.8 kg./cm.$^2$ at room temperature. The air of the air-blast is at room temperature.

The support penetrates directly into the oven 9 which is 11 meters long. This oven is fed with heated air at a temperature of 175° C. At the outlet of the oven, the band is cooled down by means of a flow of cool air and is then rolled.

EXAMPLE II

In accordance with a modification of the process of Example I, a plastisol identical to plastisol 5 above, except that its pigment is different, is sprayed with the sprayer 10 onto the support. The sprayer 10 is identical in design and spraying cone to sprayer 4 and operates under the same conditions. An intermediate blowing is carried out with the blower 11. This blower is identical to blower 8 except that it is fed with air heated to 160° C. Blower 11 is located 100 mm. above the support.

The products of both examples have a remarkably glossy and embossed appearance.

In both examples, there are used polyvinyl chlorides polymerized in water emulsion. The K number is determined on a solution in cyclohexanone according to Fikentscher's method (see Cellulose Chemie, 1932, vol. 13, p. 60). Examples of suitable pigments having an excellent resistance to heat and light are cadmium yellow, chrome red and cobalt blue (see Penn W. S., PVC Technology, London, 1962, p. 177).

It will be understood that the above description of the present invention is susceptible to various modifications, changes and adaptations, and the same are intended to be comprehended within the meaning and range of the equivalents of the appended claims.

What is claimed is:

1. Decorative surface coverings of gelled plastisols containing vinyl chloride mer-units, said coverings having differently colored regions and a non-uniform thickness, the color transition from one region to another being progressively graded, said gelled plastisols containing occlusions of organic liquids.

2. Coverings as claimed in claim 1, wherein said organic liquids are selected from the group consisting of glycols and the ethers thereof.

3. Coverings as claimed in claim 1, said occlusions providing a scintillating effect.

References Cited

UNITED STATES PATENTS

| 3,214,286 | 10/1965 | Rambuger | 117—72 |
| 3,230,284 | 1/1966 | Iverson et al. | 264—73 |
| 3,224,894 | 12/1965 | Palmer | 117—45 |
| 3,562,098 | 2/1971 | Plumez | 117—39 |
| 2,662,033 | 12/1953 | Andrew | 117—8 |

RALPH S. KENDALL, Primary Examiner

M. F. ESPOSITO, Assistant Examiner

U.S. Cl. X.R.

117—8, 37, 62, 63; 264—73